(12) United States Patent
Fukuda

(10) Patent No.: US 6,366,306 B1
(45) Date of Patent: Apr. 2, 2002

(54) PRINTER CALIBRATION METHOD AND APPARATUS THEREFOR

(75) Inventor: Hiroshi Fukuda, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/521,412

(22) Filed: Mar. 8, 2000

(30) Foreign Application Priority Data

Mar. 8, 1999 (JP) .......................................... 11-060816

(51) Int. Cl.[7] ................................................. B41J 35/16
(52) U.S. Cl. .................................................... 347/172
(58) Field of Search ................................ 347/172, 178, 347/188; 358/518, 519, 515, 523; 382/162, 167

(56) References Cited

U.S. PATENT DOCUMENTS 5,376,952 A * 12/1994 Kokubo et al. ............. 347/172
6,027,201 A *  2/2000 Edge .......................... 347/19
6,108,441 A *  6/2000 Hiratsuka et al. ........... 382/167

* cited by examiner

*Primary Examiner*—N. Le
*Assistant Examiner*—K. Feggins
(74) *Attorney, Agent, or Firm*—Sughrue Mion, PLLC

(57) ABSTRACT

To calibrate a printer that prints a full-color image on a recording paper in a color frame sequential fashion, a gray pattern is printed by the printer onto a recording paper, to three color densities of the gray pattern. A recording energy correction amount for magenta is determined based on a difference between the measured magenta density and a set magenta density. Then density variations in yellow and cyan from their set values are estimated that would be resulted from the recording energy correction for magenta. Then recording energy correction amounts for yellow and cyan that reduce the estimated density variations are calculated. Thereafter, density variations in magenta and cyan that would be resulted from the recording energy correction for yellow are estimated, and recording energy correction amounts for magenta and cyan that reduce the estimated density variations are calculated. Also, density variations in magenta and yellow that would be resulted from the recording energy correction for cyan are estimated, and recording energy correction amounts for magenta and yellow that reduce the estimated density variations are calculated. The same procedures are repeated till estimated three color densities approximate the respective set values.

16 Claims, 11 Drawing Sheets

PRINTER CALIBRATION METHOD AND APPARATUS THEREFOR

BACKGROUND OF THE INVENTION

1. Field of the Invention

The present invention relates to a printer calibration method and an apparatus therefor, especially for a printer where density or recording history of one color has an influence on density of another color.

2. Background Arts

Generally, color balance and gradation of images printed by a printer vary unexpectedly with many parameters, including conditions of recording paper, environmental conditions, and mechanical conditions of the printer. Therefore, it is necessary to make a calibration of the printer before printing, to achieve a high reproduction.

In a conventional calibration method, a test pattern having an yellow (Y) patch, a magenta (M) patch and a cyan (C) patch, and sometimes a black patch, is printed by the printer to calibrate, and densities of the respective patches are measured by a density measuring device. Then, the printer is calibrated on the basis of the results of measurements so that the respective patches are printed at predetermined set density values. Thereby, the printer should reproduce gray at proper color balance in the entire gradation range.

However, even after the respective color densities are adjusted to the set values, gray is not always reproduced properly. That is, in a printer that prints a full-color image in a color frame sequential fashion, recording conditions of one color can be affected by the previous recording of another color. As a result, even though the same energy is used for recording, density of one color can be different from each other when the color is recorded solely, and when the color is recorded in combination with other colors, for example, for printing a gray image.

Especially, in a thermosensitive color printer that prints an image on a thermosensitive color recording paper by heating the paper directly, coloring characteristic curves of inner thermosensitive coloring layers are affected by the recording on upper thermosensitive coloring layers.

Specifically, electromagnetic rays for fixing the uppermost yellow coloring layer of the thermosensitive color recording material can also fix the next magenta coloring layer to a little degree, and thereby lowers thermal sensitivity of the magenta coloring layer. Since the amount of yellow fixing electromagnetic rays that reach the magenta coloring layer is lessened by yellow pixels previously recorded on the yellow coloring layer, the effect of the yellow fixing rays on the thermal sensitivity of the magenta coloring layer is reduced with an increase in density of previously recorded the yellow pixels.

Consequently, as shown in FIG. 17, even when the same gradation data is used for recording magenta pixels, the magenta coloring layer is colored at higher densities in a gray image portion where the yellow coloring layer is previously colored, as compared to a magenta image portion where the yellow coloring layer is not colored, and thus the largest amount of yellow fixing rays reach the magenta coloring layer.

In addition to the effect of the optical fixing rays, heat energy applied for the thermal recording on the upper coloring layer have an effect on the coloring density of the next color. The heat energy causes a change in surface characteristics of the recording paper, and thus increases heat conductivity of the thermosensitive recording paper. Therefore, the coloring density or the amount of developed pigments of the magenta coloring layer gets higher in the gray image portion as compared to the magenta image portion. The same applies not only to the gray image portion, but also to any colors where pixels are previously recorded on an upper coloring layer.

For these reasons, even through the respective colors are adjusted to the set values with respect to the sole-color patches, consequent gray can not be neutral and have a hue because of the difference in coloring density from the sole-color portion. Therefore, the conventional calibration method is insufficient for those printing systems where density or recording history of one color affects density of another color.

SUMMARY OF THE INVENTION

In view of the foregoing, an object of the present invention is to provide an accurate calibration method that is useful for a printer that prints a full-color image on a recording paper in a color frame sequential fashion, and thus for those printing systems where density or recording history of one color affects recording density of another color.

To achieve the above objects, a calibration method of the present invention is comprised of the following steps:

A. printing a pattern predetermined for use in calibration on a recording paper by the printer;

B. measuring color separation densities of the printed pattern;

C. detecting a density difference between the measured density of a first color and a set density of the first color;

D. calculating a first correction amount for correcting recording energy for the first color on the basis of the density difference detected in the step C;

E. estimating densities of second and third colors of the pattern that would be obtained if the pattern is printed after the recording energy for the first color is corrected with the first correction amount;

F. detecting a density difference between the estimated density of the second color and a set density of the second color;

G. calculating a second correction amount for correcting recording energy for the second color on the basis of the density difference detected in the step F;

H. estimating densities of the first and third colors of the pattern that would be obtained if the pattern is printed after the recording energy for the second color is corrected with the second correction amount;

I. detecting a density difference between the last obtained estimated density of the third color and a set density of the third color;

J. calculating a third correction amount for correcting recording energy for the third color on the basis of the density difference detected in the step I;

K. estimating densities of the first and second colors of the pattern that would be obtained if the pattern is printed after the recording energy for the third color is corrected with the third correction amount;

L. detecting a density difference between the last obtained estimated density of the first color and the set density of the first color;

M. checking if the density difference detected in the step L is within a predetermined range;

N. repeating the steps C to M till the density difference detected in step L comes within the predetermined range, while using the last obtained estimated densities of the first and second colors and the set density of the third color in place of the measured densities of the respective colors;

O. memorizing, when the density difference detected in step L comes within the predetermined range, the last obtained recording energy correction amounts for the first to third colors; and P. correcting the recording energies for the first to third colors with the memorized recording energy correction amounts.

According to the present invention, three color densities of the pattern, preferably a gray pattern, that is printed by the printer are measured, and a recording energy correction amount for one color is determined based on differences between the set densities and the measured densities. Then, density variations of the other two colors that would be resulted from the recording energy correction of the one color are estimated. Thereafter, recording energy correction amounts for these two colors are determined so as to reduce the estimated density variations of these two colors. The same processes are executed repeatedly for each of the three colors so as to obtain recording energy correction amounts for the three colors that minimize the differences between the measured or estimated densities and the set densities of the three colors. In this way, effect of the recording energy correction of one color onto the density variations of the other colors is taken into consideration. Therefore, the color balance and gradation are calibrated accurately to reproduce neutral gray.

Since there is no need for printing and measuring test prints of three colors, the calibration method of the present invention saves the cost and time for calibration.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
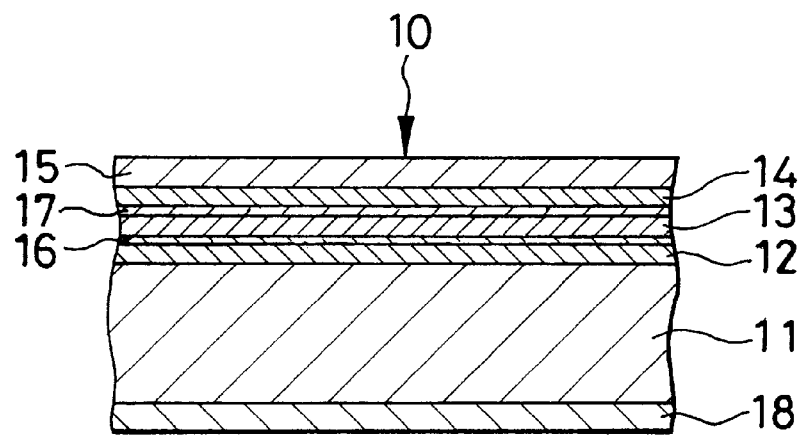
FIG. 1 is an explanatory diagram illustrating a thermosensitive color recording paper.

In FIG. 1, a thermosensitive color recording paper 10, hereinafter called simply a recording paper 10, has a layered construction consisting of a base material 11, cyan, magenta and yellow thermosensitive coloring layers 12, 13 and 14, and a protective layer 15, which are formed in this order toward an obverse surface of the recording paper 10. The protective layer 15 is for protecting the coloring layers 12 to 14, and is made of a transparent plastic whose main component is PVA (polyvinyl alcohol).

Thermal sensitivities of the coloring layers 12 to 14 depend on the position from the obverse surface. The cyan coloring layer 12 has the lowest thermal sensitivity, whereas the yellow coloring layer 14 has the highest thermal sensitivity. The position of these coloring layers 12 to 14 may be changeable. Intermediate layers 16 and 17 are formed in between the coloring layers 12 to 14, to control the thermal sensitivities of the coloring layers 12 to 14. Also a backing layer 18 is formed on the back side of the base material 11.

Thermal recording on the coloring layers is carried out sequentially from the obverse side, i.e. from the most sensitive yellow coloring layer 14 to the least sensitive cyan coloring layer 12, by applying heat energies to the recording paper 10 whose ranges gradually increasing from one coloring layer to another. To stop the previously colored coloring layer 14 or 13 from being colored unnecessarily by the heat energy applied for coloring the next coloring layer 13 or 12, the yellow and magenta coloring layers 14 and 13 are designed to lose their coloring capacities when exposed to electromagnetic rays of around 420 nm or 365 nm respectively.

Figure 2:
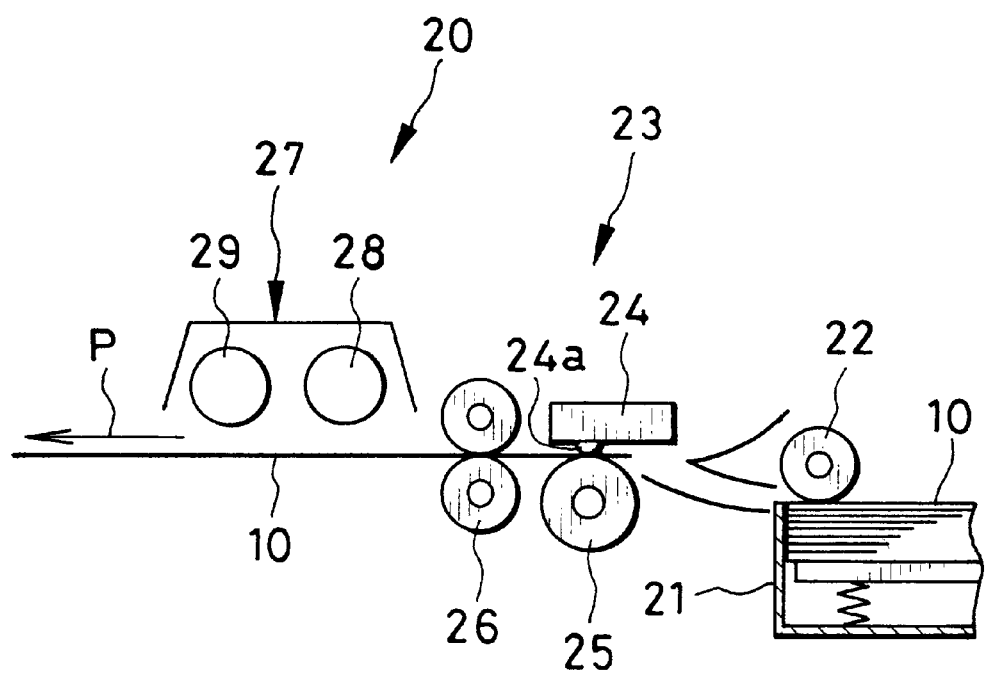
FIG. 2 is a thermosensitive color printer according to an embodiment of the present invention.

In a thermosensitive color printer 20 shown in FIG. 2, the recording paper 10 is fed from a paper supply cassette 21 to a print stage 23 by a paper feed roller 22. In the print stage 23, there are a thermal head 24, a platen roller 25, a pair of conveyer rollers 26, and an optical fixing device 27 arranged along a paper conveying path.

The conveyer rollers 26 moves the recording paper 10 back and forth along the paper conveying path. While the recording paper 10 moves in a printing direction P, the platen roller 25 presses the recording paper 10 onto an array of heating elements 24a of the thermal head 24. The heating elements 24a are driven to record a full-color image on the recording paper 10 in a color frame sequential fashion. While a yellow frame is recorded on the yellow coloring layer 14, a yellow fixing lamp 28 of the optical fixing device 27 is driven to project light of around 420 nm onto the recording paper 10 to fix the yellow coloring layer 14. Thereafter while the recording paper 10 moves in the printing direction P for the second time, a magenta frame is recorded on the magenta coloring layer 13, and a magenta fixing lamp 29 is driven to project light of around 365 nm to fix the magenta coloring layer 13. Then while the recording paper 10 moves in the printing direction P for the third time, a cyan frame is recorded on the cyan coloring layer 12. Although the cyan coloring layer is not optically fixed, the magenta fixing lamp 29 is driven during the cyan frame recording, to bleach blank portions of the recording paper 10.

Figure 3:
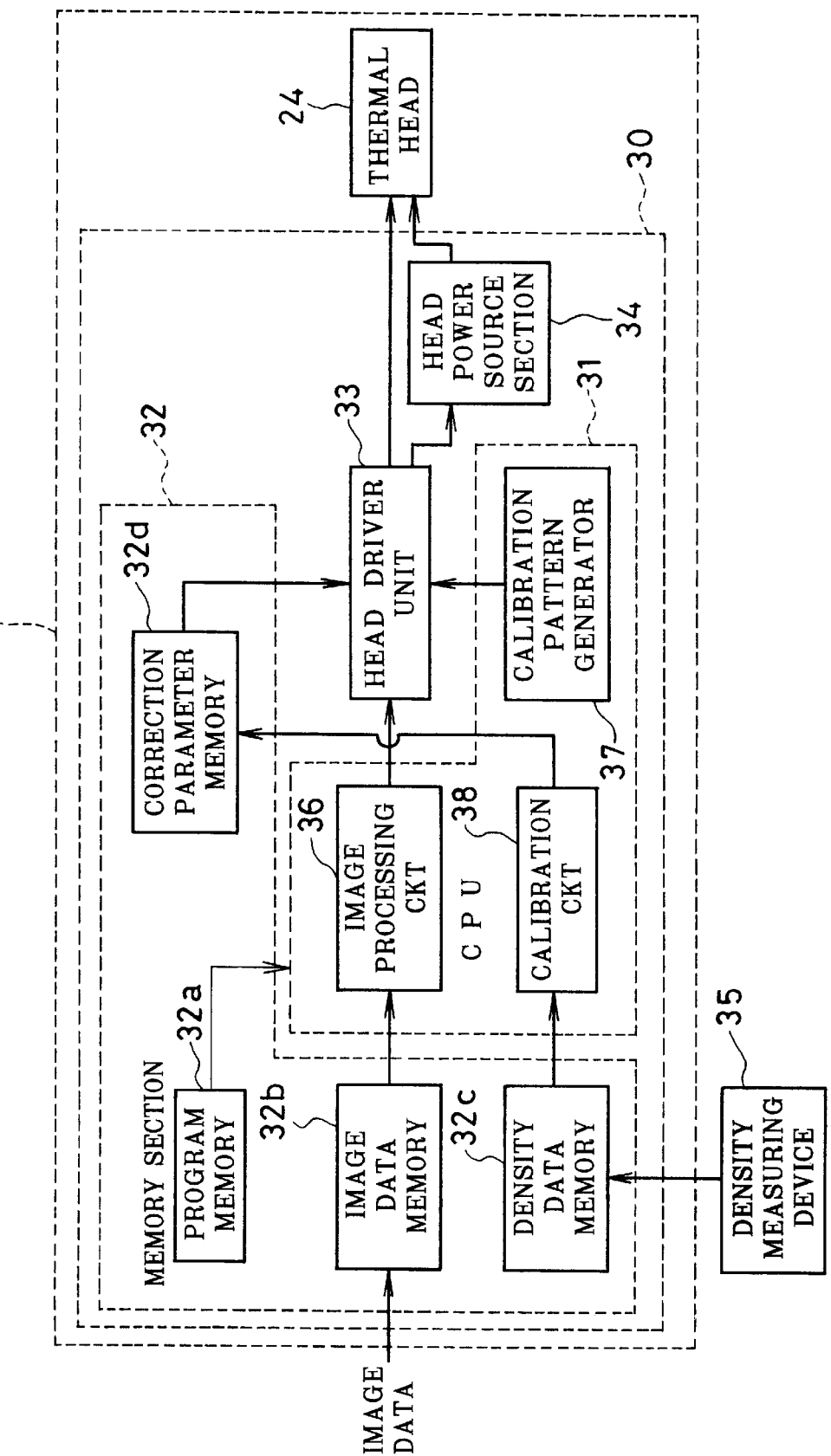
FIG. 3 is a block diagram of the thermosensitive color printer.

As shown in FIG. 3, the thermal head 24 is driven under the control of a control circuit 30. The control circuit 30 consists of a CPU 31, a memory section 32, a head driver unit 33, and a head power source section 34. A density measuring device 35 is connected to the control circuit 30.

The memory section 32 includes a program memory 32a storing various kinds of processing programs, an image data memory 32b, a density data memory 32c, a correction parameter memory 32d and other memory locations for other purposes. The CPU 31 controls respective parts of the printer 20 for printing, and also carries out operations for image-processing and those for calibration. For this purpose, the CPU 31 includes an image processing circuit 36, a calibration pattern generator 37 and a calibration circuit 38.

The image processing circuit 36 effects well-known color correction and tone correction on image data of an image that is read out from the image data memory 32b so as to record the image appropriately in view of density, color and gradation. The corrected image data is sent to the head driver unit 33 in a line sequential fashion. The head driver unit 33 drives the heating elements 24a of the thermal head 24 in accordance with the image data of one line, synchronously with the movement of the recording paper 10, to thermally record pixels line by line on the recording paper 10.

Figure 4:
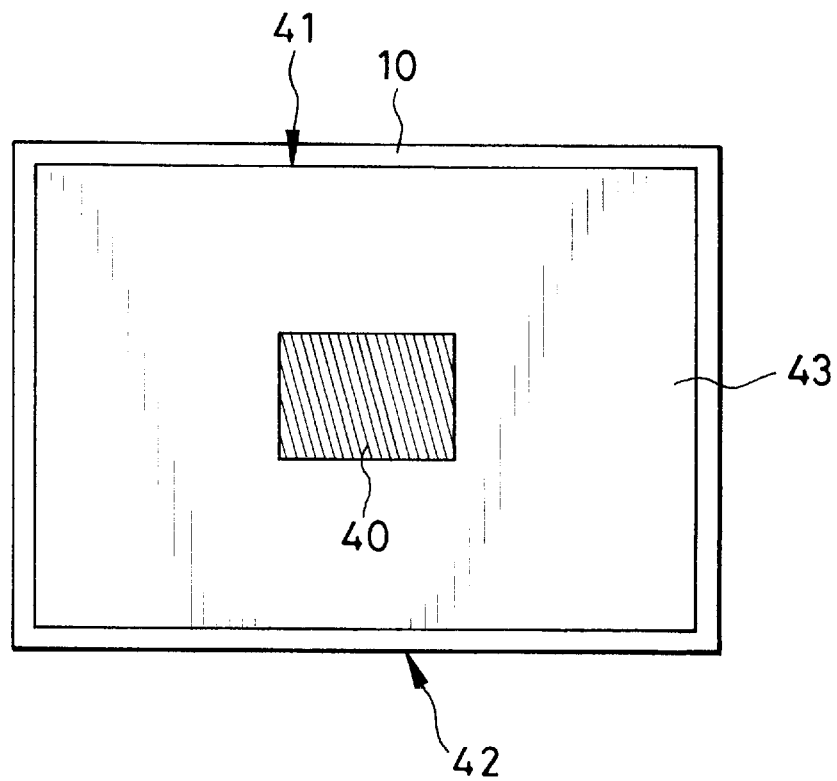
FIG. 4 is an explanatory diagram illustrating a test print having a gray pattern thereon for use in calibration of the thermosensitive printer.
Figure 15:
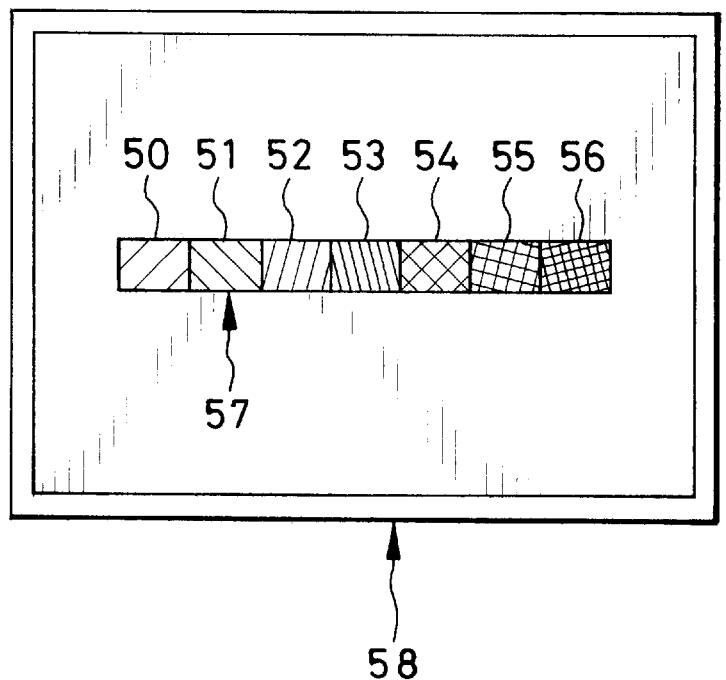
FIG. 15 is an explanatory diagram illustrating another example of test print having a gray pattern thereon, the gray pattern having a gray scale for use in the calibration.

The calibration pattern generator 37 outputs data for printing a calibration pattern to the head driver unit 33 when a calibration mode is selected through a not-shown keyboard or the like. Thereby, a gray pattern 41 is printed on the recording paper 10, to provide a test print 42 for calibration, as shown in FIG. 4. The gray pattern 41 has a rectangular gray patch 40 in its center. The gray path 40 has an optical density of 0.7, whereas a background 43 of the gray pattern 41 is white. However, the gray path 40 as well as the background 43 may have other appropriate densities.

Figure 5A:
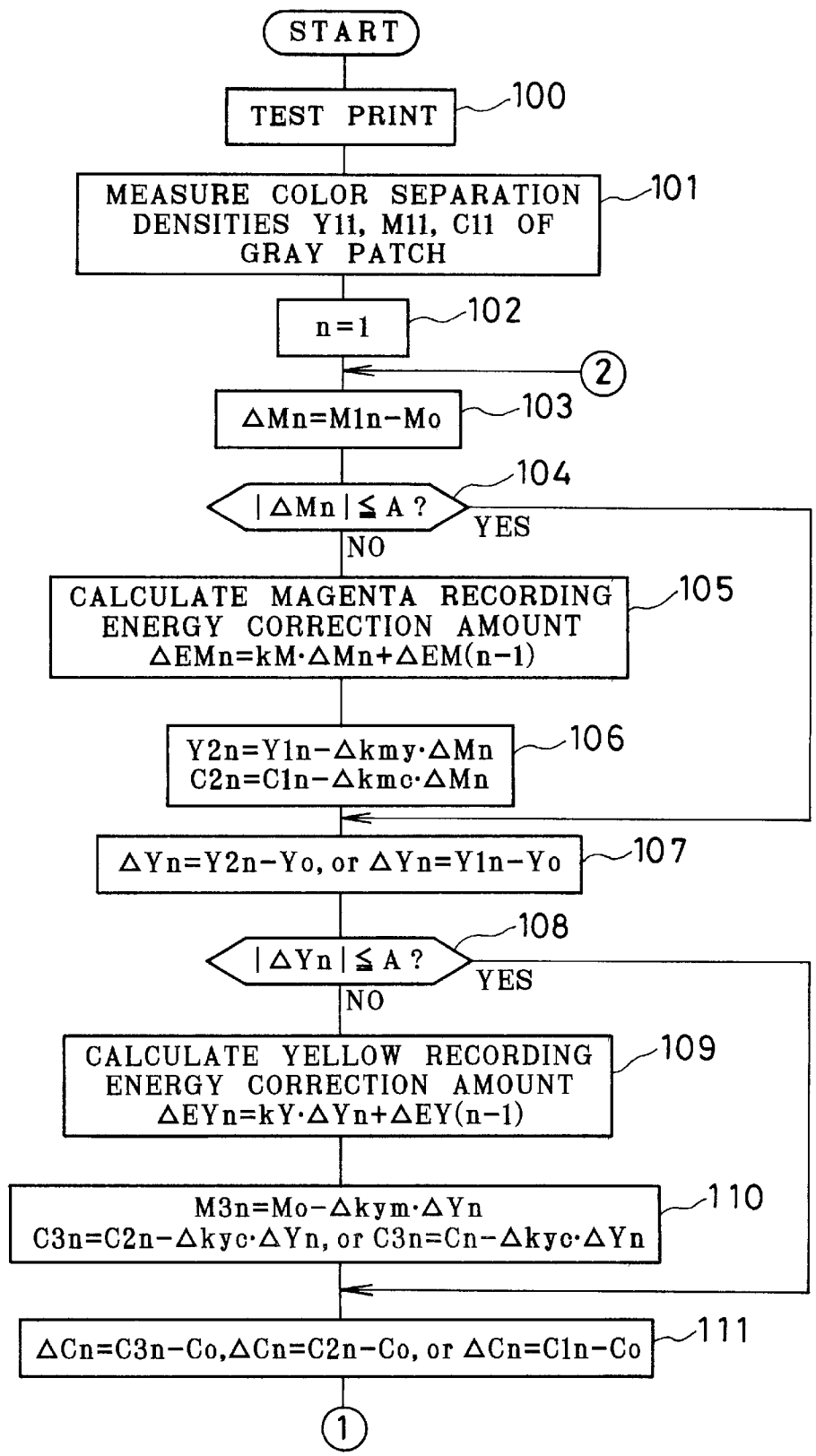
FIGS. 5A and 5B show a flow chart illustrating a calibration sequence according to a method of the present invention.
Figure 5B:
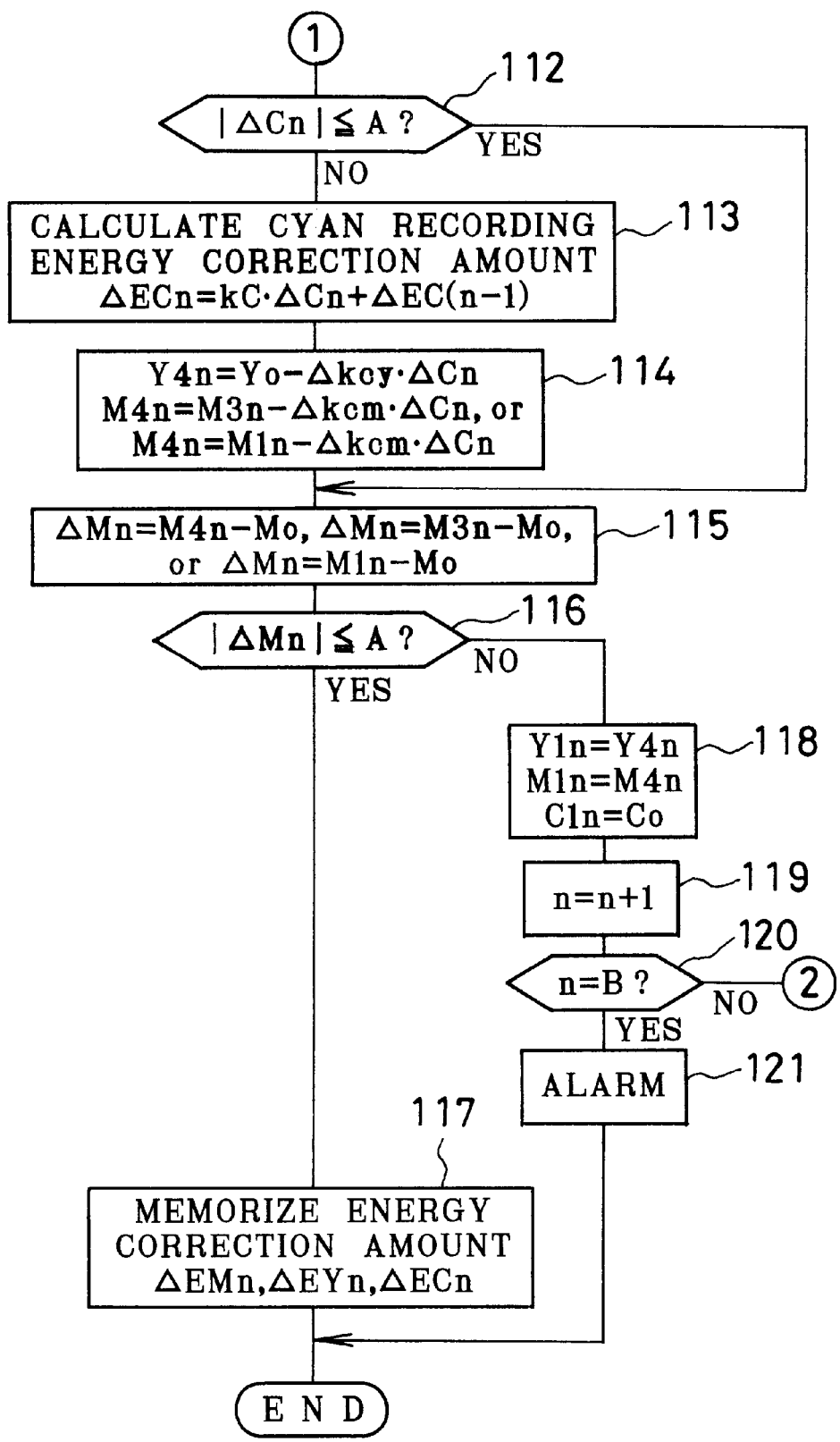

The operation for calibration is carried out according to the sequence shown in FIGS. 5A and 5B. After the test print 42 is produced in step 100, the test print 42 is set in the density measuring device 35 in step 101, to measure three-color separation densities of the gray patch 40. The density measuring device 35 consists of a photo sensor combined with blue-, green- and red-pass filters which are seriatim inserted in an optical path. The three color separation densities measured through the density measuring device 35 are subjected to a logarithmic conversion to provide density data Y11, M11 and C11 of three colors. The logarithmic conversion may be carried out in the density measuring device 35 or in the control circuit 30.

The density data Y11, M11 and C11 is stored in the density data memory 32c. The calibration circuit 38 derives a magenta recording energy correction amount ΔEM, a yellow recording energy correction amount ΔEY and a cyan recording energy correction amount ΔEC from the density data Y11, M11 and C11 through the following operations.

First, a difference ΔMn between an actually measured magenta density M1n and a set magenta density M0 is detected by calculation. Immediately after the start of the calibration mode, a number "n" used for looping the calibration sequence is set to be "1" in step 102. Thus, a magenta density difference ΔM1 between the density data M11 and the set magenta density M0 is calculated in step 103. Then, the absolute value |ΔM1| of the difference ΔM1 is compared to a reference value A in step 104. If the absolute value |ΔM1| is more than the reference value A, the sequence proceeds to step 105. If, on the other hand, the absolute value |ΔM1| is not more than the reference value A, the sequence skips from the step 104 to step 107. The step 107 will be described later.

In the step 105, a magenta recording energy correction amount ΔEM1 is calculated according to the following equation:

$$\Delta EMn = kM \cdot \Delta Mn + \Delta EM(n-1) \text{ Since } n=1, \Delta EM1 = kM \cdot \Delta M1 + \Delta EM0$$

wherein kM is a coefficient predetermined by experiments, and ΔEM(n−1) is a last obtained magenta recording energy correction amount, so ΔEM0 is "0" when calculating ΔEM1, that is, the last obtained magenta recording correction amount is zero when calculating the magenta recording energy correction amount for the first time.

Figure 6:
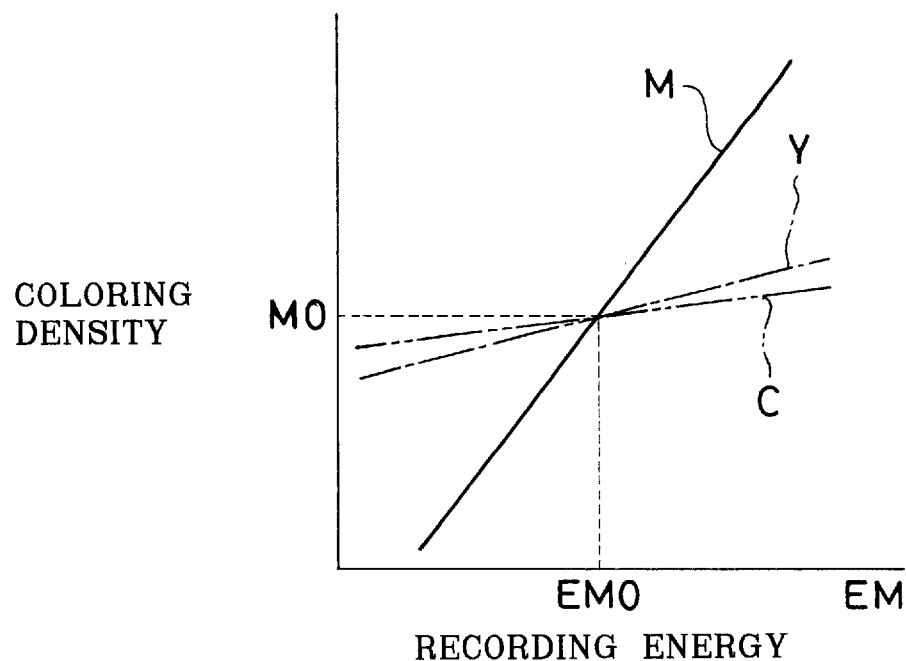
FIG. 6 is a graph illustrating density characteristic curves of yellow, magenta and cyan coloring layers of the thermosensitive color recording paper obtained by changing magenta recording energy only.

As described with respect to the prior arts, it has been found by experiments that coloring densities of the yellow and cyan coloring layers 14 and 12 slightly increase with an increase in magenta recording energy applied for recording magenta pixels, even while heat energies applied for recording yellow and cyan pixels are maintained respectively constant, as shown for example in FIG. 6, that illustrates density characteristic curves Y, M and C of the yellow, magenta and cyan coloring layers 14, 13 and 12 obtained while changing magenta recording energy EM only.

Figure 7:
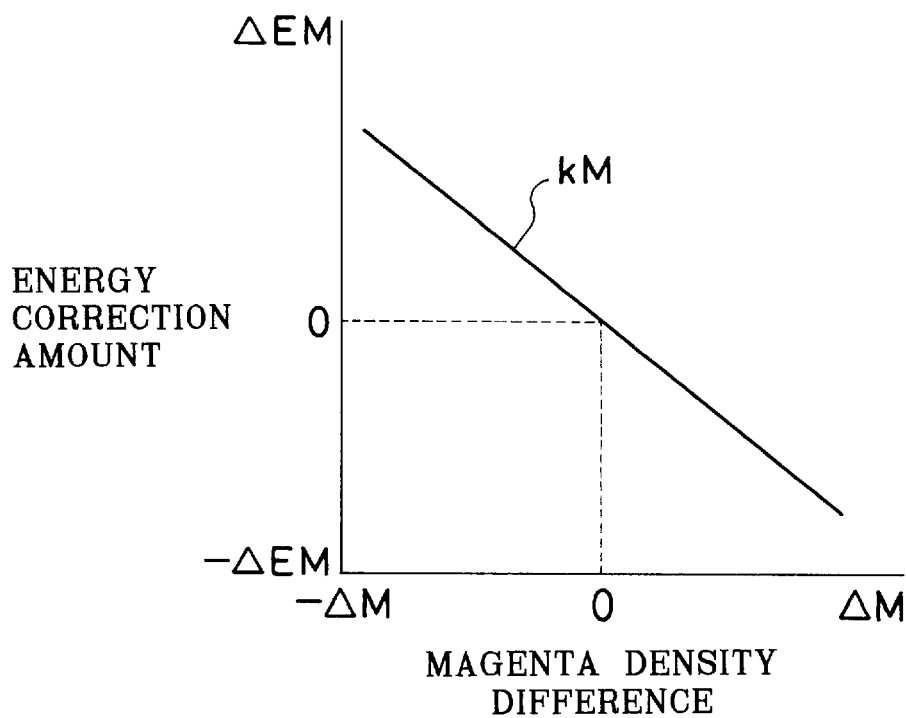
FIG. 7 is a graph illustrating a relationship between a magenta density difference and a magenta recording energy correction amount.

FIG. 7 shows a relationship between a magenta density difference ΔM from the set magenta density M0 and a magenta recording energy correction amount ΔEM for canceling or eliminating the magenta density difference ΔM. The coefficient kM represents the inclination of the curve of FIG. 7. Thus, the magenta recording energy correction amount ΔEM1 is determined by the magenta density difference ΔM1 according to the relationship shown in FIG. 7.

Figure 8:
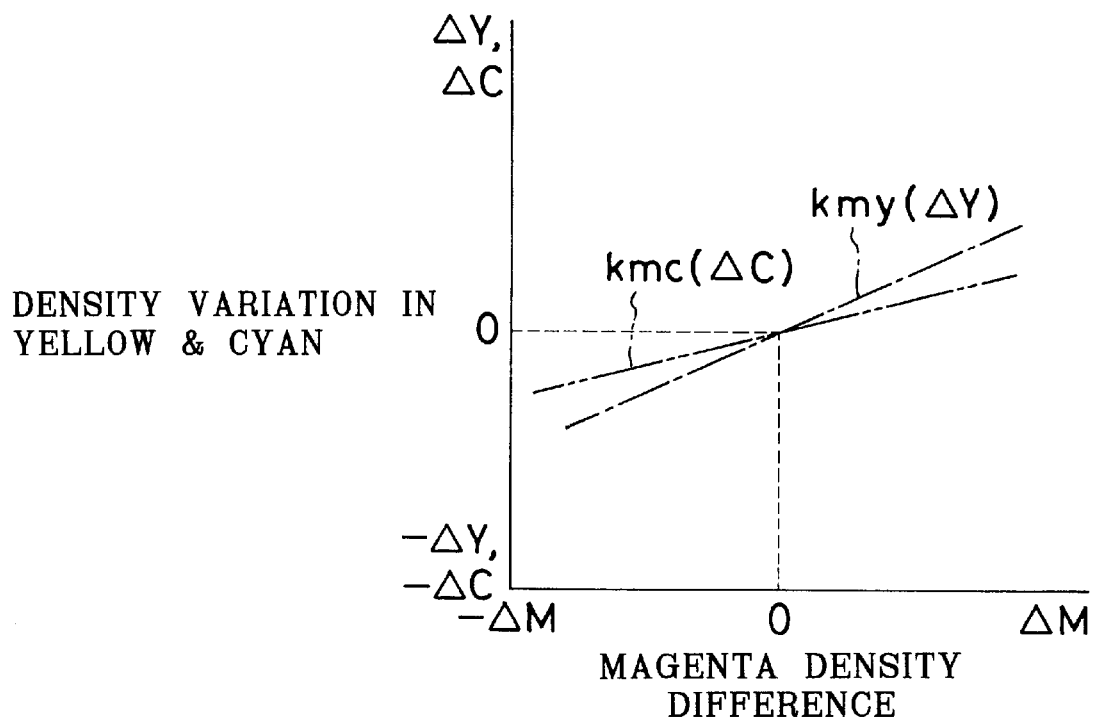
FIG. 8 is a graph illustrating variations in yellow and cyan densities in relation to the magenta density difference.

After the magenta density difference ΔM1 is obtained, a yellow density Y21 and a cyan density C21 of the gray patch 40, which are expected to be obtained if magenta pixels of the gray patch are recorded at a heat energy value that is corrected with the magenta recording energy correction amount ΔEM1, are estimated in step 106 based on the density difference ΔM1 according to the following equations:

$$Y21 = Y11 - \Delta kmy \cdot \Delta M1$$

$$C21 = C11 - \Delta kmc \cdot \Delta M1$$

wherein kmy and kmc represent the inclinations of curves shown in FIG. 8 that show relationships between the magenta density difference ΔM and density variation amounts ΔY and ΔC in the yellow and cyan densities resulted from the change in the magenta density respectively.

Thereafter, a difference ΔY1 between the estimated yellow density Y21 and a set yellow density Y0 is calculated in the step 107 according to the following equation:

$$\Delta Y1 = Y21 - Y0$$

However, in case the sequence skips from the step 104 to the step 107 since the absolute value $|\Delta M1|$ is not more than the reference value A in the step 104, the yellow density difference $\Delta Y1$ is calculated based on the measured yellow density Y11 according to the following equation:

$$\Delta Y1 = Y11 - Y0$$

Then, the absolute value $|\Delta Y1|$ of the difference $\Delta Y1$ is compared to the reference value A in step 108. If the absolute value $|\Delta Y1|$ is more than the reference value A, the sequence proceeds to step 109. If, on the other hand, the absolute value $|\Delta Y1|$ is not more than the reference value A, the sequence skips from the step 108 to step 111 as will be described later.

Figure 9:
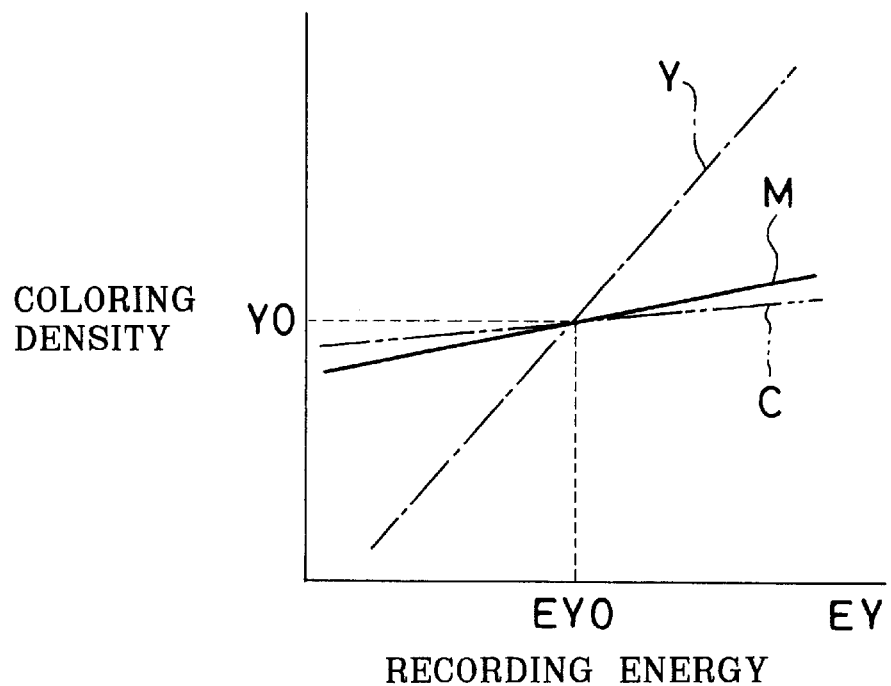
FIG. 9 is a graph illustrating density characteristic curves of yellow, magenta and cyan coloring layers of the thermosensitive color recording paper obtained by changing yellow recording energy only.
Figure 10:
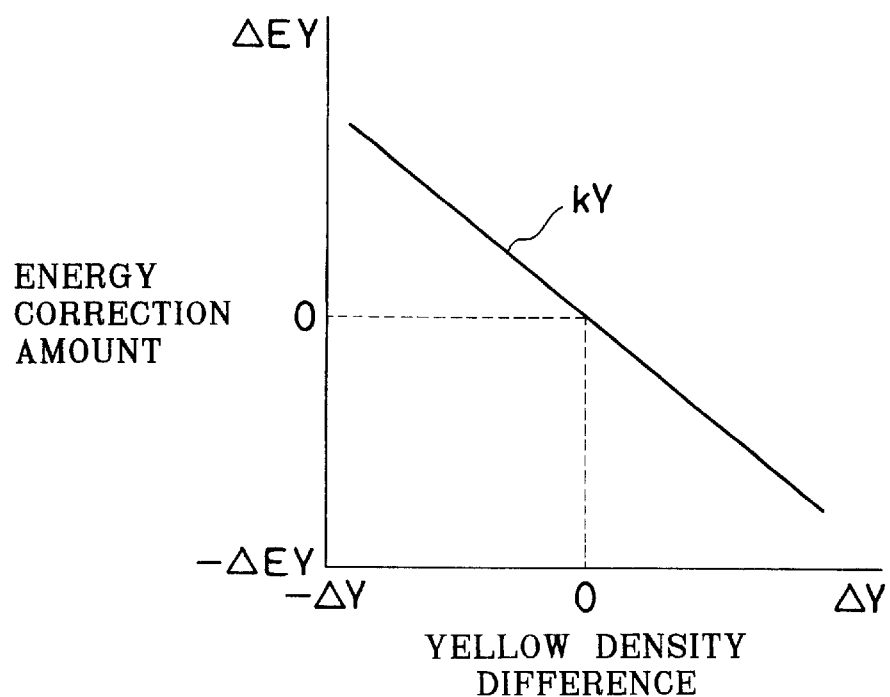
FIG. 10 is a graph illustrating a relationship between a yellow density difference and a yellow recording energy correction amount.

In the step 109, the yellow recording energy correction amount $\Delta EY1$ is calculated according to the following equation:

$$\Delta EYn = kY \cdot \Delta Yn + \Delta EY(n-1) \text{ Since } n=1, \Delta EY1 = kY \cdot \Delta Y1 + \Delta EY0$$

wherein $\Delta EY(n-1)$ is a last obtained yellow recording energy correction amount, so $\Delta EY0$ is "0", and wherein kY is a coefficient that is predetermined by experiments in the same way as the coefficient kM. That is, the coefficient kY is determined based on density characteristic curves shown in FIG. 9 that are detected by changing yellow recording energy EY only, and represents the inclination of a curve shown in FIG. 10 that shows a relationship between a yellow density difference $\Delta Y$ from the set yellow density Y0 and a yellow recording energy correction amount $\Delta EY$ for canceling that yellow density difference $\Delta Y$.

Figure 11:
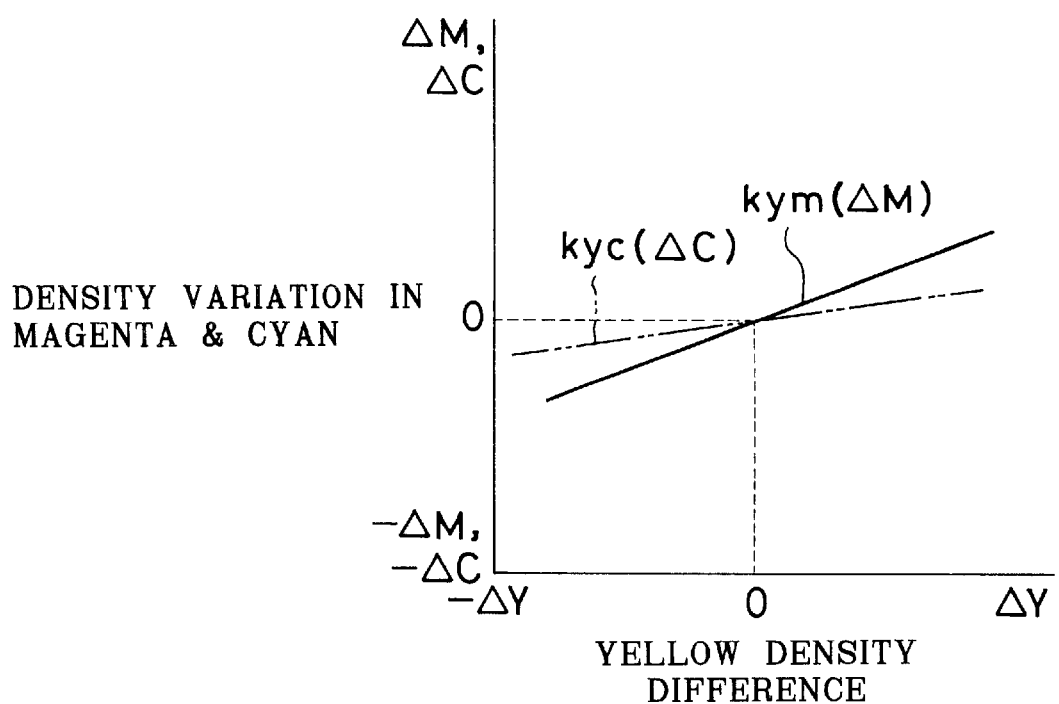
FIG. 11 is a graph illustrating variations in magenta and cyan densities in relation to the yellow density difference.

Thereafter, a magenta density M31 and a cyan density C31 of the gray patch 40, which are expected to be obtained if yellow pixels of the gray patch are recorded at a heat energy corrected with the yellow recording energy correction amount $\Delta EY1$, are estimated in step 110 based on the density difference $\Delta Y1$ according to the following equations:

$$M31 = M0 - \Delta kym \cdot \Delta Y1$$

$$C31 = C21 - \Delta kyc \cdot \Delta Y1$$

wherein kym and kyc represent inclinations of curves shown in FIG. 11 that show relationships between the yellow density difference $\Delta Y$ and density variation amounts $\Delta M$ and $\Delta C$ in the magenta and cyan densities resulted from the change in the yellow density respectively.

If the cyan density C21 is not estimated since the sequence skipped from the step 104 to the step 107, the cyan density C31 is calculated based on the measured cyan density C11 in place of the estimated cyan density C21.

Thereafter, a difference $\Delta C1$ between the estimated cyan density C31 and a set cyan density C0 is calculated in the step 111 according to the following equation:

$$\Delta C1 = C31 - C0$$

However, in case the sequence skips from the step 108 to the step 111, as the absolute value $|\Delta Y1|$ is not more than the reference value A, the formerly estimated cyan density C21 is substituted for the value C31 in calculating the cyan density difference $\Delta C1$. If either of the cyan densities C31 and C21 has not been estimated, as the absolute values $|\Delta M1|$ and $|\Delta Y1|$ are not more than the reference value A, the cyan density difference $\Delta C1$ is calculated based on the measured cyan density C11 in place of the estimated cyan density C31 or C21.

Then, the absolute value $|\Delta C1|$ of the difference $\Delta C1$ is compared to the reference value A in step 112, in the same way as for yellow coloring density. If the absolute value $|\Delta C1|$ is more than the reference value A, the sequence proceeds to step 113. If, on the other hand, the absolute value $|\Delta C1|$ is not more than the reference value A, the sequence proceeds to step 115 as will be described later.

Figure 12:
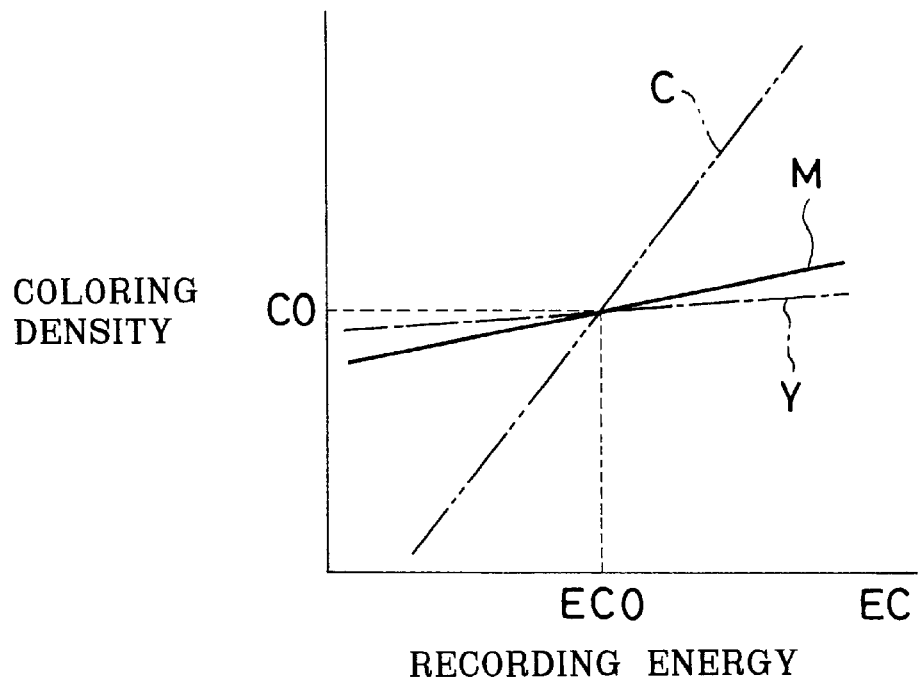
FIG. 12 is a graph illustrating density characteristic curves of yellow, magenta and cyan coloring layers of the thermosensitive color recording paper obtained by changing cyan recording energy only.
Figure 13:
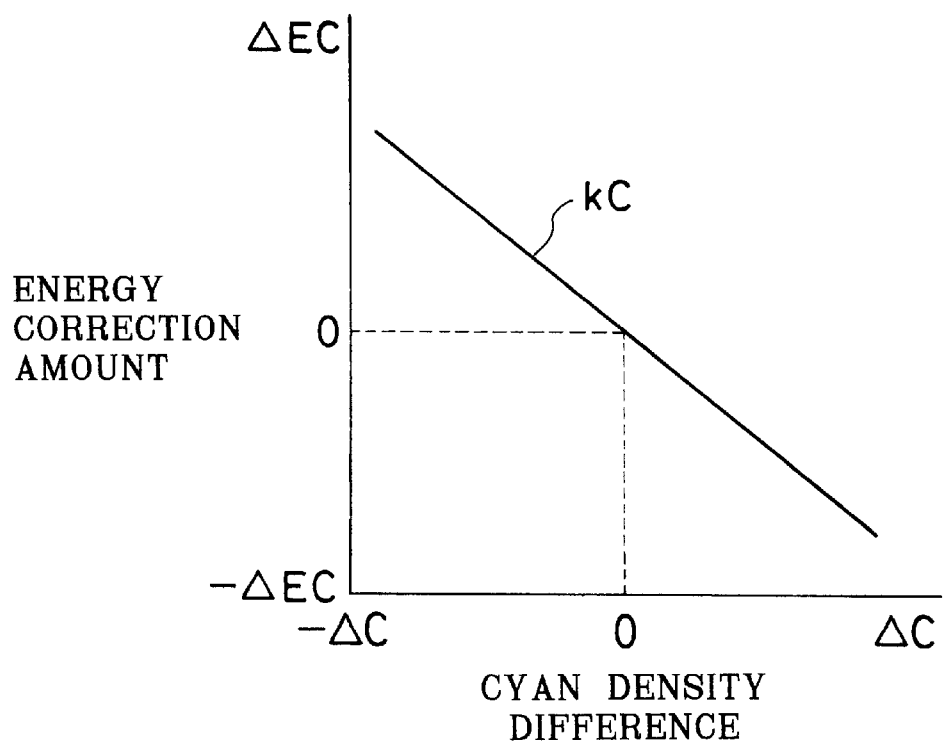
FIG. 13 is a graph illustrating a relationship between a cyan density difference and a cyan recording energy correction amount.

In step 113, the cyan recording energy correction amount $\Delta EC1$ is calculated according to the following equation:

$$\Delta ECn = kC \cdot Cn + \Delta EC(n-1) \text{ Since } n=1, \Delta EC1 = kC \cdot \Delta C1 + \Delta EC0$$

wherein $\Delta EC(n-1)$ is a last obtained cyan recording energy correction amount, so $\Delta EC0$ is "0", and wherein kC is a coefficient that is predetermined by experiments in the same way as the coefficients kM and kY. That is, the coefficient kC is determined based on density characteristic curves shown in FIG. 12, and represents the inclination of a curve shown in FIG. 13 that shows a relationship between a cyan density difference $\Delta C$ from the set yellow density C0 and the cyan recording energy correction amount $\Delta EC$ for canceling that cyan density difference $\Delta C$.

Figure 14:
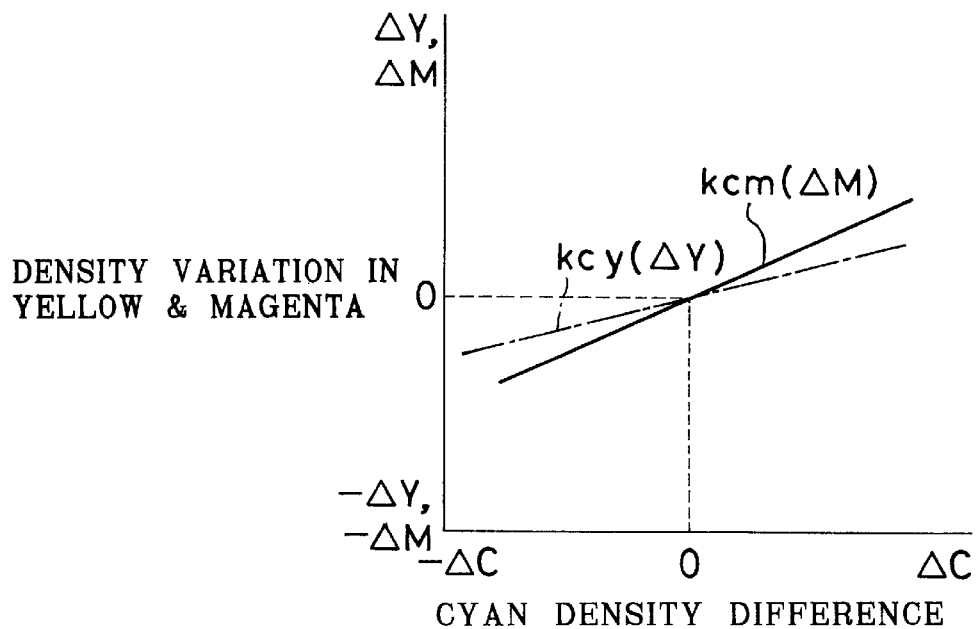
FIG. 14 is a graph illustrating variations in yellow and magenta densities in relation to the cyan density difference.
Figure 16:
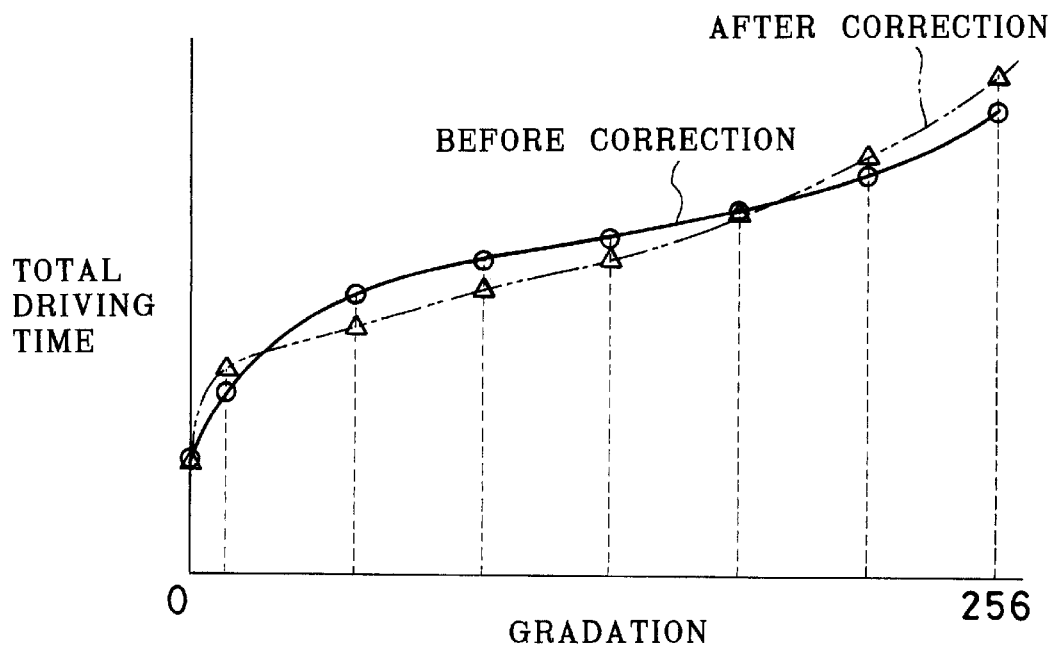
FIG. 16 is a graph illustrating an example of results of spline interpolation using recording energy correction amounts obtained by use of the test print having the gray scale.
Figure 17:
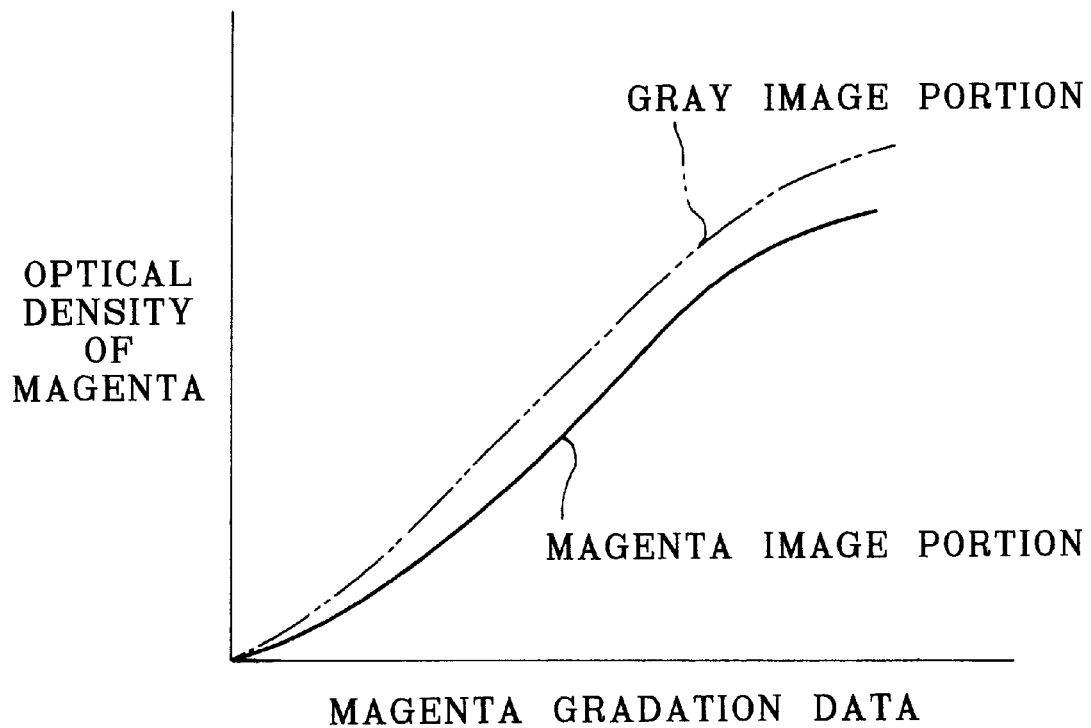
FIG. 17 is a graph illustrating magenta coloring curves with respect to magenta gradation data in a magenta image portion and in a gray image portion.

Thereafter, a yellow density Y41 and a magenta density M41 of the gray patch 40, which are expected to be obtained if cyan pixels of the gray patch 40 are recorded at a heat energy corrected with the cyan recording energy correction amount $\Delta EC1$, are estimated in step 114 based on the density difference $\Delta C1$ according to the following equations:

$$Y41 = Y0 - \Delta kcy \cdot \Delta C1$$

$$M41 = M31 - \Delta kcm \cdot \Delta C1$$

wherein kcy and kcm represent the inclinations of curves shown in FIG. 14 that show relationships between the cyan density difference $\Delta C$ and density variation amounts $\Delta Y$ and $\Delta M$ in the yellow and magenta densities resulted from the change in the cyan density respectively.

But if the magenta density M31 is not estimated since the sequence skipped from the 108 to the step 111, the magenta density M41 is estimated based on the measured magenta density M11 in place of the estimated magenta density M31.

Thereafter, a magenta density difference $\Delta M1$ is calculated again based on the estimated magenta density M41 in the step 115 according to the following equation:

$$\Delta M1 = M41 - M0$$

wherein the formerly estimated magenta density M31 is substituted for the value M41 in case the sequence skipped from the step 112 to the step 115. If the value M31 is not estimated either, the magenta density difference $\Delta M1$ is calculated based on the measured magenta density M11. Then, the absolute value $|\Delta M1|$ of the magenta density difference is compared to the reference value A in step 116.

If the absolute value $|\Delta M1|$ is more than the reference value A, the sequence returns to the step 103 through steps 118, 119 and 120. In the step 118, the estimated value M41 or M31 is substituted for the value M1n in the equation to calculate a difference $\Delta Mn$ in the step 103. In the step 119, the number "n" is incremented by "1" to show how many times the sequence loops. That is, the number of times of looping "n" is counted up to "2" in this instance. Thereafter, the number "n" is compared to a predetermined upper limit B. If the number n does not reach the upper limit B, the same sequence as above is executed from the steps 103 to 116. Thereby, the looping is repeated to converge the magenta recording energy correction amount $\Delta EMn$ until the magenta density gets closer enough to the set value M0, and thus the absolute value of the density difference ΔMn gets equal to or less than the reference value A.

If the number n reaches the upper limit B, the printer alarms in step 121, and terminates the calibration sequence. In that case, the operator should change the reference value A or other parameters to make the calibration again.

If the absolute value |ΔM1| is not more than the reference value A in the step 116, the sequence proceeds to step 117 where the last obtained recording energy correction amounts ΔEMn, ΔEYn and ΔECn for the respective colors are written in the correction parameter memory 32d.

Thereafter, voltage values to be applied to the thermal head 24 are detected from the respective recording energy correction amounts ΔEMn, ΔEYn and ΔECn. Then, the heating elements 24a of the thermal head 24 are driven at the corrected voltage values. In that case, the voltage values are detected from the respective recording energy correction amounts ΔEMn, ΔEYn and ΔECn in accordance with relationships between the voltage values and the recording energy correction amounts ΔEMn, ΔEYn and ΔECn that are previously detected by experiments. The correction of the recording energy may be made by changing the total driving times of the heating elements 24a instead of changing the drive voltage.

Although the above described calibration is made to converge the magenta recording energy correction amount, it is possible to make the calibration to converge the yellow or the magenta recording energy correction amount. Although the same reference value A is used for the three colors, it is possible to predetermine respective reference values.

The density measuring device 35 may be constituted of three color photo sensors having respective color filters. It is also possible to incorporate a density measuring device into the printer. In that case, the test print may be inserted into a slit of the printer to measure the three color densities of the gray pattern.

Instead of the gray pattern 41 having the single gray patch 40, it is possible to produce a test print 58 having a gray scale pattern 57 that consists of several gray patches 50, 51, 52, 53, 54, 55 and 56 of different density grades. In that case, three-color separation densities of the respective gray patches 50 to 56 are measured and used for calculating recording energy correction amounts ΔEM, ΔEY and ΔEC. Thereafter, the total driving time for each gradation step is corrected in accordance with the correction amounts. Intermediate values between the corrected total driving times for the respective gradation steps are determined by spline interpolation or linear interpolation. To obtain energy correction amounts for several gradation steps in this way, a lookup table memory is used in place of the correction parameter memory 32d, and data of the corrected total driving time is read out from the lookup table memory in correspondence with the gradation data.

The printer may be a type that records a black frame in addition to the three color frames to print a full-color image. In that case, the calibration method of the present invention is preferably applied to a high brightness area, i.e. a low density area on the print, where the gray is produced from the yellow, magenta and cyan pixels. As for a low brightness area, i.e. a high density area on the print, that is constituted of the black pixels, it is preferable to use a conventional single color calibration method, because it requires less operations, and thus saves the time for calibration. It is also possible to determine coefficients for calculating the energy correction amounts on the basis of light values or logarithmically converted light values instead of optical densities.

The calibration method of the present invention is applicable not only to the above described thermosensitive color printer, but also to other kinds of thermal printers or to other types of printers. For example, the present invention is applicable to a thermal printer having three thermal heads for recording three colors respectively, or to an ink-jet printer or a laser printer, insofar as the printer prints an image in a color frame sequential fashion, and the density of one color is affected by density of another color of the same image.

Thus, the present invention is not to be limited to the above embodiments but, on the contrary, various modifications will be possible to those skilled in the arts without departing from the scope of the invention as claimed in the appended claims.

What is claimed is:

1. A calibration method for a printer that prints a full-color image on a recording paper in a color frame sequential fashion, the calibration method comprising the steps of:

A. printing a pattern predetermined for use in calibration onto a recording paper by the printer;

B. measuring color separation densities of the printed pattern;

C. detecting a density difference between the measured density of a first color and a set density of the first color;

D. calculating a first correction amount for correcting recording energy for the first color on the basis of the density difference detected in the step C;

E. estimating densities of second and third colors of the pattern that would be obtained if the pattern is printed after the recording energy for the first color is corrected with the first correction amount;

F. detecting a density difference between the estimated density of the second color obtained in the step E and a set density of the second color;

G. calculating a second correction amount for correcting recording energy for the second color on the basis of the density difference detected in the step F;

H. estimating densities of the first and third colors of the pattern that would be obtained if the pattern is printed after the recording energy for the second color is corrected with the second correction amount;

I. detecting a density difference between the last obtained estimated density of the third color and a set density of the third color;

J. calculating a third correction amount for correcting recording energy for the third color on the basis of the density difference detected in the step I;

K. estimating densities of the first and second colors of the pattern that would be obtained if the pattern is printed after the recording energy for the third color is corrected with the third correction amount;

L. detecting a density difference between the last obtained estimated density of the first color and the set density of the first color;

M. checking if the density difference detected in the step L is within a predetermined range;

N. repeating the steps C to M till the density difference detected in step L comes within the predetermined range, while using the last obtained estimated densities of the first and second colors and the set density of the third color in place of the measured densities of the respective colors;

O. memorizing, when the density difference detected in step L comes within the predetermined range, the last obtained recording energy correction amounts for the first to third colors; and P. correcting the recording energies for the first to third colors with the memorized recording energy correction amounts.

2. A calibration method as claimed in claim 1, further comprising the steps of:

checking if the density difference detected in the step C is within a predetermined range;

skipping over the steps D and E when the density difference detected in the step C is within the predetermined range;

checking if the density difference detected in the step F is within a predetermined range;

skipping over the steps G and H when the density difference detected in the step F is within the predetermined range;

checking if the density difference detected in the step I is within a predetermined range; and skipping over the steps J and K when the density difference detected in the step I is within the predetermined range, wherein the measured density of one of the first to third colors is used in place of the estimated density of the one color to detect the density difference in one of the steps F, I and L, if all of the density estimation steps of the one color are skipped.

3. A calibration method as claimed in claim 2, wherein the recording energy correction amount for each color is calculated in accordance with a previously obtained characteristic curve representative of a relationship between the density difference of that color and the recording energy correction amount for that color.

4. A calibration method as claimed in claim 3, wherein the density estimation of the second and third colors in the step E is based on the measured density of the second and third colors, the density estimation of the first color in the step H is based on the set density of the first color, the density estimation of the third color in the step H is based on the estimated density or the measured density of the third color, the density estimation of the second color in the step K is based on the set density of the second color, and the density estimation of the first color in the step K is based on the estimated density of the first color obtained in the step H or the measured density of the first color.

5. A calibration method as claimed in claim 1, wherein the pattern consists of a gray patch of a uniform density.

6. A calibration method as claimed in claim 1, wherein the pattern consists of a plurality of gray patches of different density grades, and the steps B to O are carried out with respect to the respective gray patches to obtain a plurality of recording energy correction amounts for different density grades.

7. A calibration method as claimed in claim 6, further comprising the step of deriving intermediate values between the plurality of recording energy correction amounts from the plurality of recording energy correction amounts by spline interpolation or linear interpolation.

8. A calibration method as claimed in claim 1, wherein the printer is a thermosensitive color printer, and the recording paper has a cyan thermosensitive coloring layer, a magenta thermosensitive coloring layer and a yellow thermosensitive coloring layer formed on a base material in this order toward an obverse of the recording paper.

9. A calibration method as claimed in claim 8, wherein the first, second and third colors are respectively magenta, yellow and cyan.

10. A calibration method as claimed in claim 1, wherein the printer records cyan, magenta, yellow and black pixels for reproducing a full-color image, and recording energy for yellow, magenta and cyan are corrected in the steps A to P with regard to a high brightness range where gray is reproduced by use of yellow, magenta and cyan pixels excluding black pixels.

11. A calibration method as claimed in claim 10, wherein magenta, yellow and cyan are the first, second and third colors respectively.

12. A calibration method as claimed in claim 1, wherein an alarm is given when the number of times of repetition of the steps C to M comes to a predetermined value.

13. A calibration apparatus for a printer that prints a full-color image on a recording paper in a color frame sequential fashion, the calibration apparatus comprising:

a calibration pattern generator for generating data to print a pattern predetermined for use in calibration;

a density measuring device for measuring color separation densities of the pattern as printed on the recording paper by the printer;

an operation device for determining recording energy correction amounts for first, second and third colors, wherein the operation device detects a density difference between a density of the first color measured by the density measuring device and a set density of the first color, calculates a first correction amount for correcting recording energy for the first color on the basis of the density difference of the first color, and estimates densities of second and third colors of the pattern that would be obtained if the pattern is printed after the recording energy for the first color is corrected with the first correction amount, then the operation device detects a density difference between the estimated density of the second color and a set density of the second color, calculates a second correction amount for correcting recording energy for the second color on the basis of the density difference of the second color, and estimates densities of the first and third colors of the pattern that would be obtained if the pattern is printed after the recording energy for the second color is corrected with the second correction amount, then the operation device detects a density difference between the estimated density of the third color and a set density of the third color, calculates a third correction amount for correcting recording energy for the third color on the basis of the density difference of the third color, and estimates densities of the first and second colors of the pattern that would be obtained if the pattern is printed after the recording energy for the third color is corrected with the third correction amount, and then the operation device detects a density difference between the last obtained estimated density of the first color and the set density of the first color, to check if the last obtained density difference of the first color is within a predetermined range, and repeats the same operation until the density difference of the first color becomes within the predetermined range, while using the last obtained estimated densities of the first and second colors and the set density of the third color in place of the measured densities of the respective colors;

a memory for memorizing the last obtained recording energy correction amounts for the first to third colors when the density difference of the first color becomes within the predetermined range; and a device for correcting the recording energies for the first to third colors with the memorized recording energy correction amounts.

14. A calibration apparatus as claimed in claim 13, wherein the printer is a thermosensitive color printer, and the recording paper has a cyan thermosensitive coloring layer, a magenta thermosensitive coloring layer and a yellow thermosensitive coloring layer formed on a base material in this order toward an obverse of the recording paper.

15. A calibration apparatus as claimed in claim 14, wherein the first, second and third colors are respectively magenta, yellow and cyan.

16. A calibration apparatus as claimed in claim 13 or 14, wherein the calibration apparatus is incorporated into the printer.

* * * * *